Dec. 28, 1965    R. C. JOSEPHSEN ETAL    3,225,950
PLASTIC BOTTLE

Filed March 22, 1965    7 Sheets-Sheet 1

ROY C. JOSEPHSEN
JOSEPH R. TINO
CHARLES R. FULCHER
INVENTORS

BY Francis F. Deel
ATTORNEY

Dec. 28, 1965     R. C. JOSEPHSEN ETAL     3,225,950
PLASTIC BOTTLE
Filed March 22, 1965     7 Sheets-Sheet 2

ROY C. JOSEPHSEN
JOSEPH R. TINO
CHARLES R. FULCHER
INVENTORS

BY Francis H. Deef
ATTORNEY

Dec. 28, 1965    R. C. JOSEPHSEN ETAL    3,225,950
PLASTIC BOTTLE
Filed March 22, 1965    7 Sheets-Sheet 3
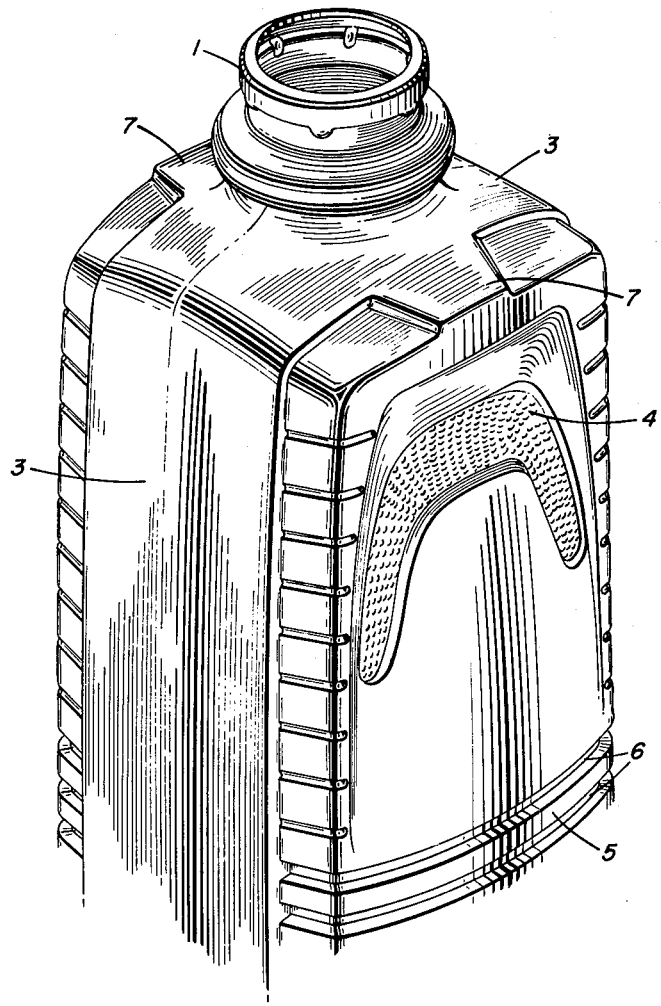
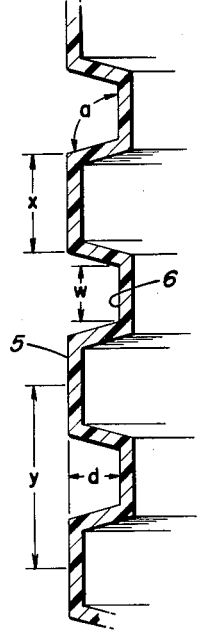
ROY C. JOSEPHSEN
JOSEPH R. TINO
CHARLES R. FULCHER
INVENTORS
BY *Francis H. Deef*
ATTORNEY Dec. 28, 1965 R. C. JOSEPHSEN ETAL 3,225,950
PLASTIC BOTTLE
Filed March 22, 1965 7 Sheets-Sheet 4

ROY C. JOSEPHSEN
JOSEPH R. TINO
CHARLES R. FULCHER
INVENTORS

BY *Francis H. Deef*

ATTORNEY

Dec. 28, 1965  R. C. JOSEPHSEN ETAL  3,225,950
PLASTIC BOTTLE
Filed March 22, 1965  7 Sheets-Sheet 5

ROY C. JOSEPHSEN
JOSEPH R. TINO
CHARLES R. FULCHER
INVENTORS

BY Francis H. Duff
ATTORNEY

Dec. 28, 1965   R. C. JOSEPHSEN ETAL   3,225,950
PLASTIC BOTTLE

Filed March 22, 1965   7 Sheets-Sheet 6

ROY C. JOSEPHSEN
JOSEPH R. TINO
CHARLES R. FULCHER
INVENTORS

BY *Francis H. Deep*
ATTORNEY

Dec. 28, 1965 R. C. JOSEPHSEN ETAL 3,225,950
PLASTIC BOTTLE
Filed March 22, 1965 7 Sheets-Sheet 7

ROY C. JOSEPHSEN
JOSEPH R. TINO
CHARLES R. FULCHER
INVENTORS

BY *Francis H. Deef*

ATTORNEY

United States Patent Office 3,225,950
Patented Dec. 28, 1965

3,225,950
PLASTIC BOTTLE
Roy C. Josephsen, Hillsdale, Joseph R. Tino, Clifton, and Charles R. Fulcher, Bloomfield, N.J., assignors to W. R. Grace & Co., New York, N.Y., a corporation of Connecticut
Filed Mar. 22, 1965, Ser. No. 441,566
3 Claims. (Cl. 215—1)

The present invention relates to a novel and useful plastic container. More particularly, it relates to a plastic bottle having a generally rectangular body which is particularly suited for the packaging of milk.

It is known in the art that containers for milk may be made of glass, waxed paper cartons, plastics and the like. In general, however, with the exception of the waxed paper cartons, such containers must be made on the basis of returnable bottles since the cost of the container is too high to permit discarding after a single use. With the advent of the more inexpensive plastics such as polyethylene and polypropylene, numerous attempts have been made to design plastic bottles which would be suitable for the packaging of milk on a nonreturnable basis. In general such attempts have met with failure. One of the main reasons for failure is that the newly designed bottles were not compatible with current bottles, cases, filling machinery and the like. Another reason is that, in order to obtain sufficient rigidity in the bottle, the side walls were made excessively thick with the net effect that the resulting bottles were too expensive from a practical standpoint. When thinner side walls were resorted to, the bottle lacked rigidity and could not be handled by conventional equipment. Quite obviously, therefore, if a bottle could be provided which would be compatible in size with those currently used and which was sufficiently rigid and inexpensive, such a bottle would receive widespread acceptance in the art.

It is an object of the present invention to provide a plastic container suitable for the packaging of milk. A further object is to provide a plastic bottle having a substantially rectangular body and being fully compatible with bottles and cartons currently produced. A still further object is to provide a plastic bottle which is sufficiently rigid so as to be processable in conventional dairy equipment. Another object is to provide a bottle which is sufficiently inexpensive so as to compete favorable with currently non-returnable milk cartons. Other objects will become apparent as the description of the invention proceeds.

These objects are accomplished by the present invention which provides a plastic bottle having a generally rectangular body, a raised open necked top at one of the smaller ends, a recessed domed bottom wall at the other smallest end, a raised flat strip of plastic running from one side of the domed bottom wall up one wall over the top and down the opposite wall to the opposite side of the domed bottom wall and with each of the two remaining side walls containing an arcuate recessed portion at the top of said side walls with a plurality of transverse flat lands and flat grooves which are spaced between the bottom portion of the arcuate section and the bottom of the bottle and extend from the flat strip of one adjacent side wall to the flat strip of the other adjacent side wall; the said flat lands having a width of from about 0.1 to about 0.3 inch and a center-to-center spacing of from about 0.25 to about 0.8 inch and the said flat grooves having a bottom width of from about 0.06 to about 0.31 inch and a depth of from about 0.05 to about 0.2 inch with the angle formed between wall and bottom of the groove being from about 98° to about 110°.

In a preferred embodiment of the present invention, the flat lands have a width of from about 0.15 to about 0.20 inch and a center-to-center spacing of from about 0.3 to about 0.4 inch and the flat grooves have a bottom width of from about 0.1 to about 0.15 inch and a depth of from about 0.05 to about 0.10 inch with the angle being from about 104° to about 106°. In a still more preferred embodiment, the flat lands have a width of about 0.19 inch and a center-to-center spacing of about 0.36 inch with the groove having a bottom width of about 0.12 inch and a depth of about 0.09 inch and the angle being about 105°.

The term "plastic" is used to signify any of the conventional polymeric materials which are thermoplastic and suitable for conventional blow molding procedures. The term includes polyesters, such as poly(ethylene terephthalate), the polycarbonamides such as 6-nylon and 66-nylon and other such materials as are well-known in the art. A particularly preferred plastic is high density polyethylene (i.e., having a density above about 0.940) homopolymer and copolymers. The preparation of such materials is disclosed in U.S. Patent 2,825,721. However, polypropylene and many other plastics would likewise be operable.

The term "generally rectangular" is used to signify a three-dimensional body in which the volume is approximately the length times the width times the height. However, the corners of the body as well as the sharp edges may be rounded without departing from the general rectangular configuration as shown in the hereinafter described drawings. The term "raised flat strips of plastic" means that a portion of the wall protrudes outward in the form of flat section so as to give a column effect to the side wall of the container. The term "arcuate recessed portion" merely signifies a flat portion of the bottle which is indented from the face in the form of an arc over the top of the side wall.

In the accompanying drawings, which illustrates preferred embodiments of the invention:

FIGURE 6 is a perspective view of another embodiment of the present invention;

FIGURE 7 is a cross-sectional view along lines 7—7 of FIGURE 2;

In FIGURES 1–15 the raised open necked top 1 is located at one of the smaller ends of the generally rectangular bodies of the bottle. At the other smallest end a recessed domed bottom wall 2 is provided. A raised flat strip of plastic 3 runs from one side of the domed bottom wall 2 up one wall over the top and down the opposite wall to the opposite side of the bottom wall 2.

Figure 1:
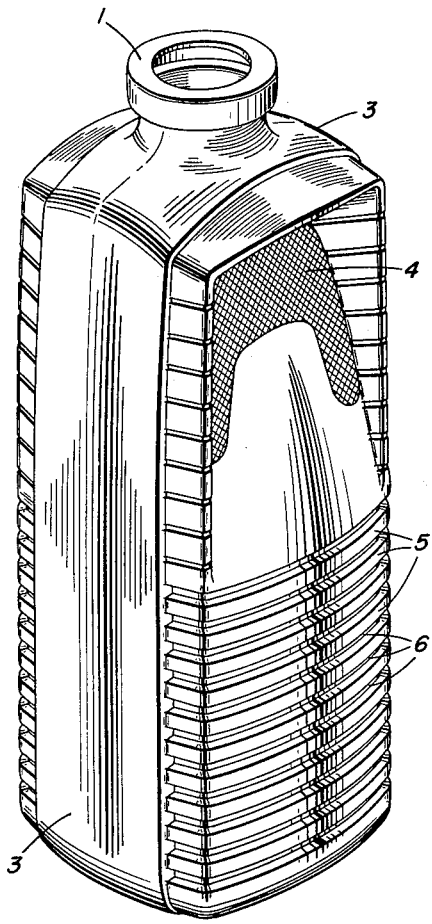
FIGURE 1 is a prespective view of a bottle of the present invention.
Figure 2:
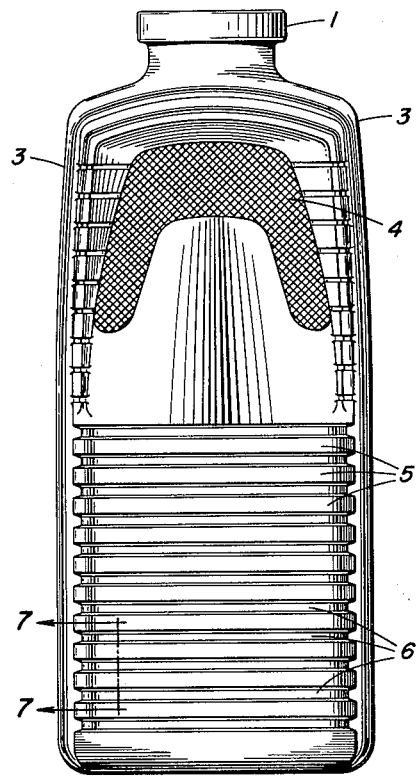
FIGURE 2 is a side view of the bottle as shown in FIGURE 1.
Figure 3:
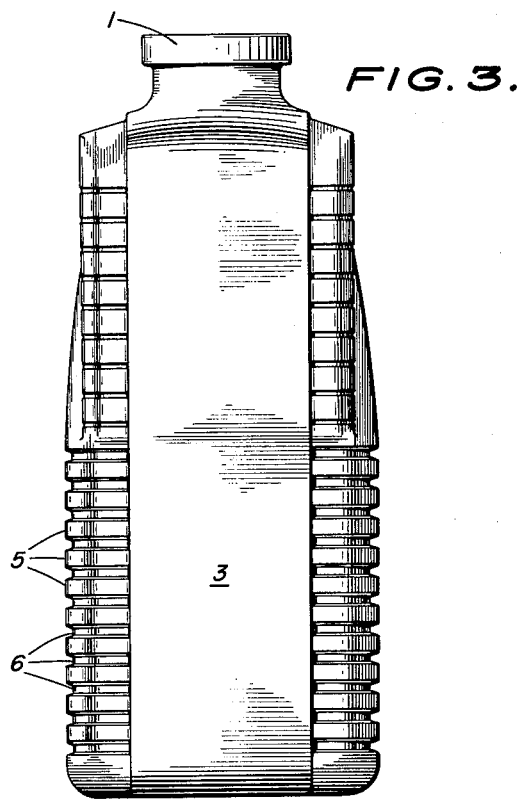
FIGURE 3 is an end view of the bottle as shown in FIGURE 1.
Figure 4:
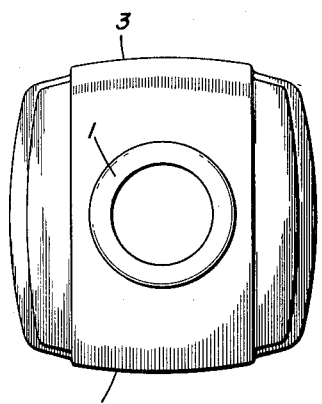
FIGURE 4 is a top view of the bottle as shown in FIGURE 1.
Figure 5:
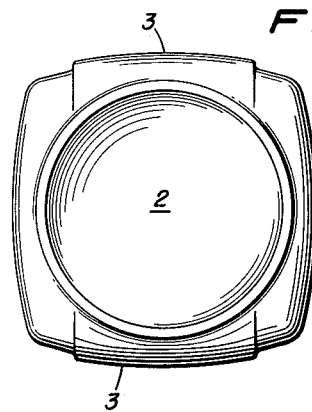
FIGURE 5 is a bottom view of the bottle as shown in FIGURE 1.
Figure 8:
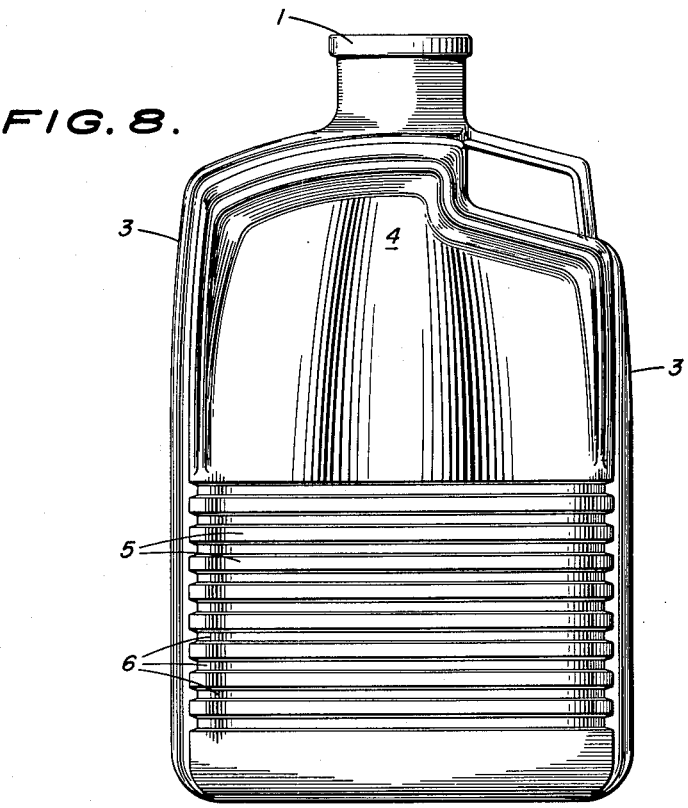
FIGURE 8 is a side view of another embodiment of the present invention.
Figure 9:
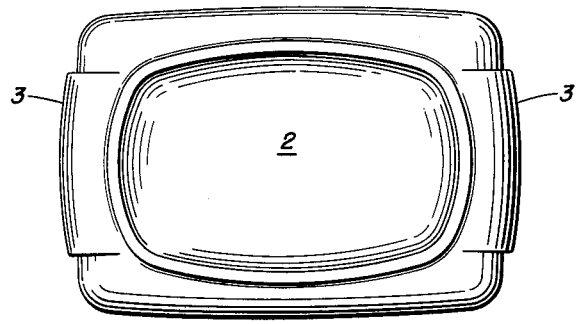
FIGURE 9 is a bottom view of the bottle as shown in FIGURE 8.
Figure 10:
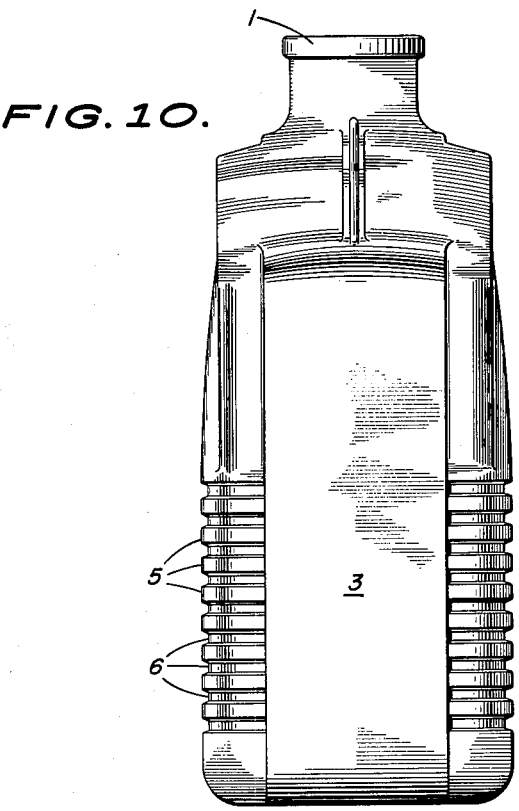
FIGURE 10 is an end view of the bottle shown in FIGURE 8.
Figure 11:
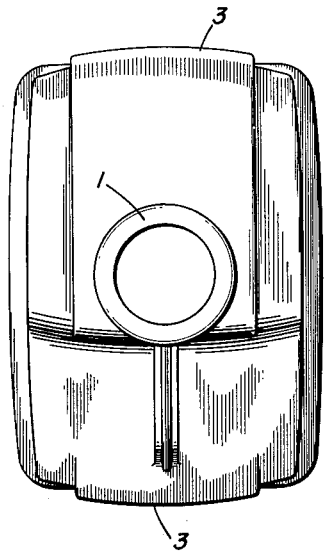
FIGURE 11 is a top view of the bottle shown in FIGURE 8.
Figure 12:
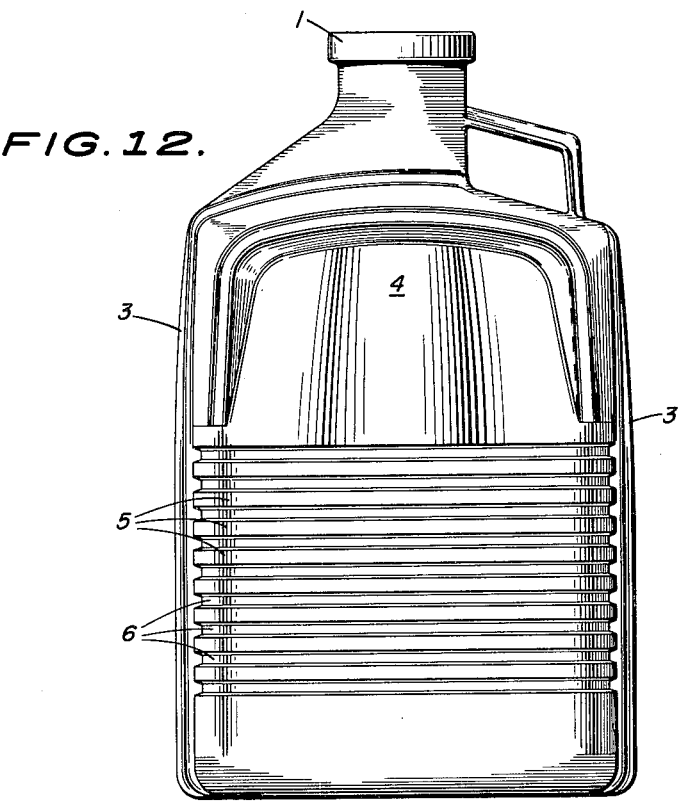
FIGURE 12 is a side view of another embodiment of the present invention.
Figure 13:
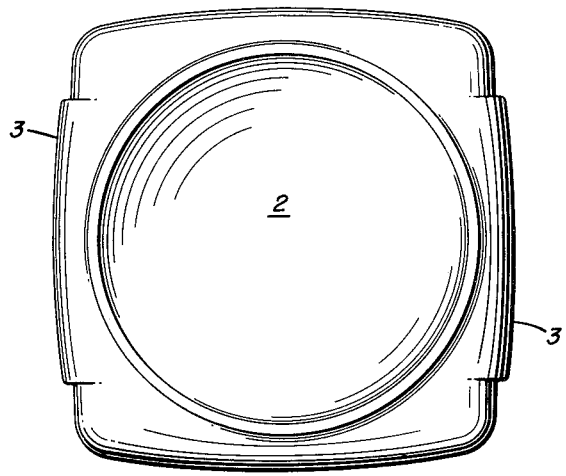
FIGURE 13 is a bottom view of the bottle shown in FIGURE 12.
Figure 14:
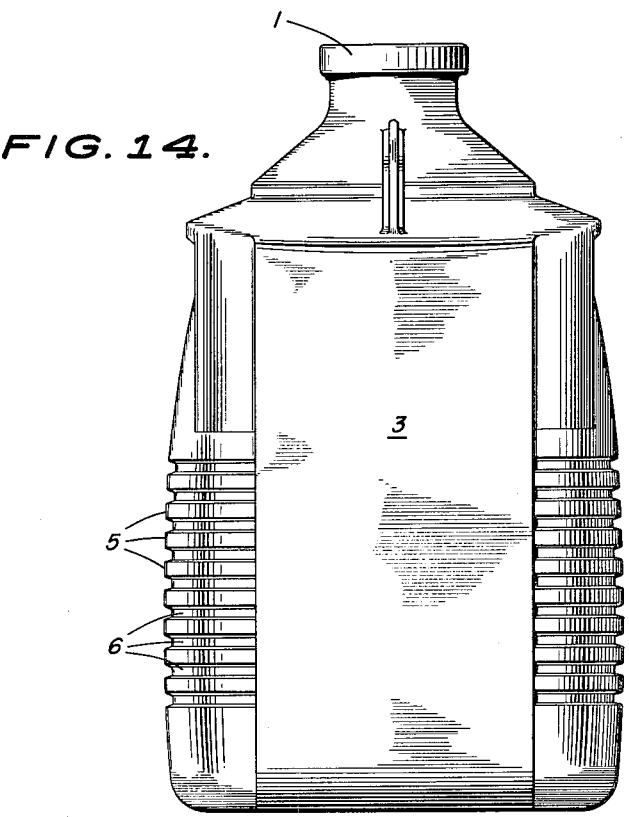
FIGURE 14 is an end view of the bottle shown in FIGURE 12.
Figure 15:
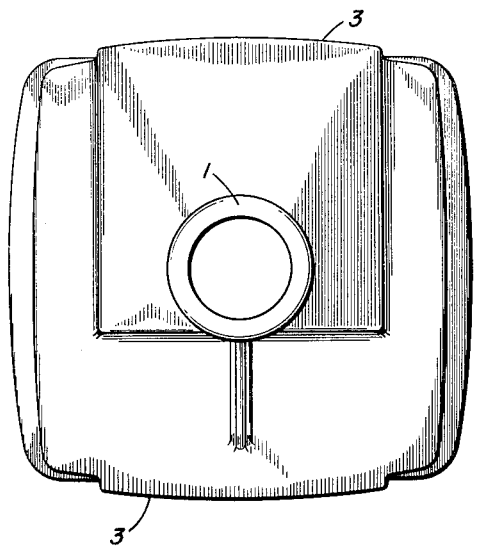
FIGURE 15 is a top view of the bottle shown in FIGURE 12.

The open raised necked top 1 is located in the center of the raised flat strip of plastic 3. The top portion of the remaining two side walls of the generally rectangular body are provided with an arcuate recessed portion 4 which may be textured, as shown in FIGURES 1, 2 and 6, or plain as shown in FIGURES 8 and 12. Between the recessed arcuate portion 4 and the bottom of the container, the container is provided with a plurality of transverse flat lands 5 and flat grooves 6 which extend around the corners of the container to the raised flat strip of plastic 3 on the adjacent side walls of the container.

The recessed arcuate portion 4 of the bottle can serve as a griping area so that the contents may be easily poured. Such an embodiment is shown in the bottles represented by FIGURES 1 to 7. The bottle may also contain a handle element provided at the top of the bottle near the neck as shown in FIGURES 8 through 15. In general, the smaller bottles will not require a separate handle element but the handle element will be provided in bottles of larger size.

In FIGURE 6, another embodiment of the present invention is shown whereby a second raised flat strip of plastic 7 connects the top portion of the raised plastic strip 3 with the edge of the container above the recessed arcuate portion 4. The additional raised plastic strip 7 substantially increases the force necessary to collapse the neck while the bottle is being capped. FIGURE 6 also shows small protrusions around the top cap area so that aluminum caps or the like are not readily loosened.

In FIGURE 7, the width of the land X is somewhat larger than the bottom of the groove W with the center-to-center spacing of the lands shown as y. The depth of the groove d is related to the angle a which varies from about 98° to about 110°.

The following examples are given to illustrate the invention and are not intended to limit it in any manner.

*Example 1*

A plastic milk bottle having the configuration shown in FIGURES 1 through 5 is blow molded using a commercial high density polyethylene blow molding grade resin. The bottle has the following approximate dimensions: overall height 10 inches; each of the side walls 8½ inches by 4 inches; raised flat strips of plastic 2¼ inches wide and raised ⅛ inch; 10 lands with a width of 0.187 inch; 11 grooves with a width of 0.125 inch and a depth of 0.090 inch with an angle of 105° between the bottom of the groove and the wall of the groove. The neck has an outside diameter of 1⅞ inches and a hole diameter of 1¼ inches so as to fit commercial milk bottle caps.

The overall weight of the bottle is 51.48 grams and it has a substantial uniform wall thickness of from about 16 to about 25 mils throughout the body portion. The thickness at the base and neck, of course, is higher. The interior contour of the bottle is substantially the same as that of the exterior.

The finished bottle holds exactly 2 quarts and is fully compatible with the machinery currently used for filling 2 quart milk bottles. The bottle occupies essentially the same space as that of the wax paper cartons currently used.

*Example 2*

A plastic milk bottle having the configuration shown in FIGURES 12 through 15 is blow molded using a commercial high density polyethylene blow molding grade resin. The bottle has the following approximate dimensions: overall height 9⅞ inches; each of the side walls 7¼ inches by 5⅞ inches; raised flat strips of plastic 3¾ inch wide and raised ⅛ inch; 9 lands with a width of 0.187 inch; 10 grooves with a width 0.125 inch and a depth 0.090 inch with an angle of 105° between the bottom of the grooves and the wall of the groove. The neck has an outside diameter of 1⅞ inches and a hole diameter of 1¼ inches so as to fit commercial milk bottle caps.

The overall weight of the bottle is 98.62 grams and it has substantially uniform wall thickness of from about 25 to about 40 mils throughout the body portion. The thickness at the base and neck, of course, is higher. The interior contour of the bottle is substantially the same as that of the exterior.

The finished bottle holds exactly 1 gallon and is fully compatible with the machinery currently used for filling gallon milk bottles. The bottle occupies essentially the same space as that of the gallon glass bottles currently used.

While in the above examples, the preparation of unpigmented bottles has been demonstrated, it is obvious that plastics may be used which could contain pigments, antistatic agents and the like providing such materials do not adversely effect the end use of the bottle. For milk and food packaging, the unpigmented polymer will generally be used so as to give a translucent effect to the bottle. If the bottle is to be used for other purposes, however, colored polymers might be desirable.

Many other equivalent modifications will be apparent to those skilled in the art from a reading of the foregoing without a departure from the inventive concept.

What is claimed is:

1. A plastic bottle having a generally rectangular body, a raised open necked top at one of the ends, a recessed domed bottom wall at the other end, a raised flat strip of plastic running from one side of the domed bottom wall up one wall over the top and down the opposite wall to the opposite side of the domed bottom wall and with each of the two remaining side walls containing an arcuate recessed portion at the top of said side walls with a plurality of transverse flat lands and flat grooves which are spaced between the bottom portion of the arcuate section and the bottom of the bottle and extend from the flat strip of one adjacent side wall to the flat strip of the other adjacent side wall; the said flat lands having a width of from about 0.1 to about 0.3 inch and a center-to-center spacing of from about 0.25 to about 0.8 inch and the said flat grooves having a width of from about 0.06 to about 0.3 inch and a depth of from about 0.05 to about 0.2 inch with the angle formed between wall and bottom of the groove being from about 98° to about 110°.

2. The plastic bottle of claim 1 wherein the said flat lands have a width of from about 0.15 to about 0.20 inch and a center-to-center spacing of from about 0.3 to about 0.4 inch and the said flat grooves have a width of from about 0.1 to about 0.15 inch and a depth of from about 0.05 to about 0.1 inch with the angle formed between the wall and bottom of the groove being about 104° to about 106°.

3. A plastic bottle of claim 1 wherein the said flat lands have a width of about 0.19 inch and a center-to-center spacing of about 0.36 inch and the flat grooves having a width of about 0.12 inch and a depth of about 0.09 inch with an angle formed between the wall and bottom of the groove being about 105°.

References Cited by the Examiner

UNITED STATES PATENTS

| | | | |
|---|---|---|---|
| D. 200,931 | 4/1965 | Josephsen et al. | 58—5 |
| D. 201,052 | 5/1965 | Josephsen et al. | 58—6 |
| D. 201,313 | 6/1965 | Josephsen et al. | |
| 3,029,963 | 4/1962 | Evers | 215—1.5 |

FRANKLIN T. GARRETT, *Primary Examiner.*